United States Patent
Haj-Fraj et al.

(10) Patent No.: US 7,566,193 B2
(45) Date of Patent: Jul. 28, 2009

(54) TOOL HEAD FOR MOVING A TOOL

(75) Inventors: Ali Haj-Fraj, Fürth (DE); Jens Hamann, Fürth (DE); Uwe Ladra, Erlangen (DE); Hans-Peter Tröndle, Forchheim (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 11/836,394

(22) Filed: Aug. 9, 2007

(65) Prior Publication Data
US 2008/0022793 A1 Jan. 31, 2008

Related U.S. Application Data

(63) Continuation of application No. PCT/EP2006/050609, filed on Feb. 2, 2006.

(30) Foreign Application Priority Data

Feb. 9, 2005 (DE) .................. 10 2005 005 905

(51) Int. Cl.
*B23C 1/12* (2006.01)
(52) U.S. Cl. .............. 409/216; 409/202; 409/185; 409/201
(58) Field of Classification Search ........... 409/201, 409/202, 212, 211, 216, 235, 185, 190, 231; 408/236–237; 74/89.38, 89.29, 89.34
See application file for complete search history.

(56) References Cited

U.S. PATENT DOCUMENTS

| | | | | | |
|---|---|---|---|---|---|
| 4,658,485 | A | * | 4/1987 | Yang | 29/26 A |
| 4,939,946 | A | * | 7/1990 | Teramachi | 74/89.3 |
| 5,051,635 | A | * | 9/1991 | Kasahara | 310/80 |
| 5,100,271 | A | * | 3/1992 | Kameyama et al. | 409/231 |
| 5,163,793 | A | * | 11/1992 | Martinez | 409/205 |

(Continued)

FOREIGN PATENT DOCUMENTS

DE 36 34 144 A1 5/1987

(Continued)

OTHER PUBLICATIONS

"Antrieb für kombinierte Rotations- und Axialbewegung z.B. elner Pinole in einer Werkzeugmaschine", www.ip.co,, IPCOM000028477D, H. Schunk und E. Bott, Nürnberg, Jun. 20, 2004.

*Primary Examiner*—Erica E Cadugan
(74) *Attorney, Agent, or Firm*—Henry M. Feiereisen; Ursula B. Day

(57) ABSTRACT

The invention relates to a tool head for moving a tool (6) having a plurality of mobile shafts (2, 4, 5, 8, 11) which allow to move the tool (6) linearly and rotationally. The invention also relates to a combination drive (10) for driving a shaft by means of which the shaft (11) driven by the combination drive (10) can perform a linear and rotational movement and to the use of a combination drive (10) for driving a shaft (11) of a tool head for moving a tool, the shaft (11) driven by the combination drive (10) being capable of performing a linear and a rotational movement. The invention finally relates to a method for movement control. The invention provides a tool head that allows very high dynamics of movement of the tool.

3 Claims, 1 Drawing Sheet

U.S. PATENT DOCUMENTS

| | | | | |
|---|---|---|---|---|
| 5,649,451 A | * | 7/1997 | Ruland | 74/89.3 |
| 5,848,458 A | * | 12/1998 | Bullen | 29/33 K |
| 6,357,094 B1 | * | 3/2002 | Sugimoto | 29/27 C |
| 2001/0043016 A1 | * | 11/2001 | Chun et al. | 310/12 |
| 2003/0077139 A1 | * | 4/2003 | Chang et al. | 409/201 |
| 2004/0151556 A1 | * | 8/2004 | Ferrari et al. | 409/201 |
| 2004/0261553 A1 | | 12/2004 | Bott et al. | |
| 2006/0291971 A1 | * | 12/2006 | Tanoue et al. | 409/202 |
| 2007/0059116 A1 | * | 3/2007 | Brunemann | 409/201 |

FOREIGN PATENT DOCUMENTS

| | | |
|---|---|---|
| DE | 43 17 971 A1 | 12/1994 |
| DE | 196 49 568 C2 | 4/1999 |
| DE | 203 11 730 U1 | 11/2003 |
| DE | 103 24 601 A1 | 12/2004 |
| DE | 10 2004 056 211 A12 | 6/2006 |
| EP | 0381155 A1 | 8/1990 |
| EP | 0 418 388 A1 | 3/1991 |
| WO | WO 99/51 389 A1 | 10/1999 |
| WO | WO-2006/084815 A1 * | 8/2006 |

* cited by examiner

TOOL HEAD FOR MOVING A TOOL

CROSS-REFERENCES TO RELATED APPLICATIONS

This application is a continuation of prior filed copending PCT International application no. PCT/EP2006/050609, filed Feb. 2, 2006, which designated the United States and has been published but not in English as International Publication No. WO 2006/084815 A1 and on which priority is claimed under 35 U.S.C. §120, and which claims the priority of German Patent Application, Serial No. 10 2005 005 905.8, filed Feb. 9, 2005, pursuant to 35 U.S.C. 119(a)-(d), the contents of which are incorporated herein by reference in their entirety as if fully set forth herein.

BACKGROUND OF THE INVENTION

The present invention relates to a tool head for moving a tool.

Nothing in the following discussion of the state of the art is to be construed as an admission of prior art.

In machines, such as for example robots, production machines and/or machine tools, tool heads are used having a plurality of movable shafts for moving a tool so as to be able to move the tool linearly and rotatably. Such tool heads are used in particular in milling machines.

It would be desirable and advantageous to provide an improved tool head to obviate prior art shortcomings.

SUMMARY OF THE INVENTION

According to one aspect of the present invention, a tool head for moving a tool includes a plurality of moveable axles for linear and rotatable movements of the tool, a shaft operatively connected to the tool, and an electric motor for driving the shaft such that the shaft is able to execute a linear movement and a rotational movement.

The present invention resolves prior art shortcomings by incorporating a combination drive in the form of an electric motor for causing a shaft to move linearly and rotationally.

According to another feature of the present invention, one of the moveable axles may be designed as a pivot axle, and the combination drive can be pivoted by means of the pivot axle. This permits any desired rotation of the combination drive, so that highly dynamic movement control is possible in almost every movement direction.

According to another feature of the present invention, one of the moveable axles may be designed as a linear axle, and the combination drive can be moved linearly by means of the linear axle. As a result, the entire subordinately-connected pivot axle can be moved in a highly dynamic fashion.

According to another feature of the present invention, the linear and rotational movements of the shaft which is driven by the combination drive can be executed at a same time. This allows complex movements to be performed in combination.

According to one aspect of the present invention, a machine tool, production machine and/or robot may be provided with a tool head according to the present invention, since in these technical fields, high demands are made on the dynamics of the movement control.

A tool head according to the present invention is thus able to attain a high degree of dynamics of the movement of a tool.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
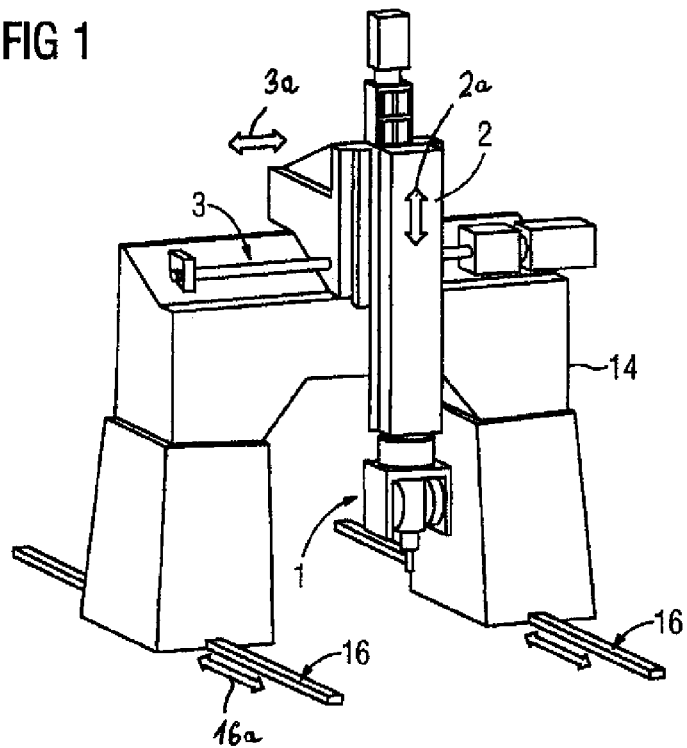
FIG. 1 shows an exemplary milling machine, having incorporated therein a tool head according to the present invention.

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown, by way of example, a milling machine having incorporated therein a tool head according to the present invention, generally designated by reference numeral 1. The milling machine has a stationary portal 14 for acceptance of the tool head 1 which can be moved vertically up and down in the direction of a Z1 axis 2, as indicated by double arrow 2a. In addition, the milling machine has a guide rail 3 for movement of the tool head 1 in a horizontal direction to the left or to the right along an X axis, as indicated by the illustrated double arrow 3a, and a guide rail 16 for movement of the tool head 1 in a horizontal forward or rearward direction along an Y axle axis, as indicated by double arrow 16a.

Figure 2:
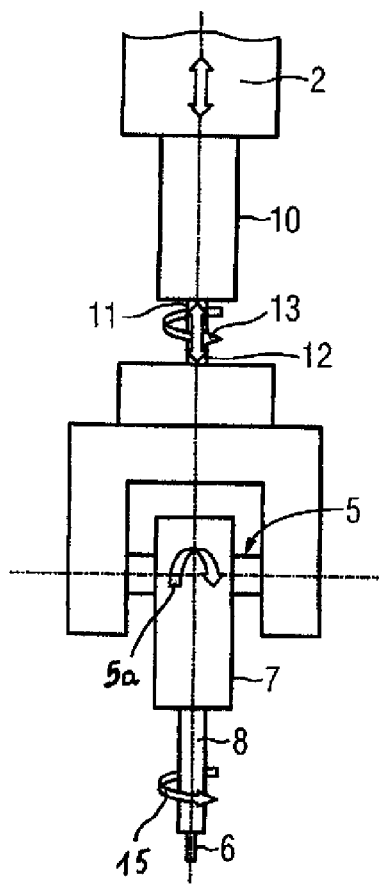
FIG. 2 is a detailed cutaway view of a first embodiment of a tool head according to the present invention.

FIG. 2 shows a detailed cutaway view of a first embodiment of a tool head 1 according to the present invention. In addition to the Z1 axis 2, the tool head 1 is rotatable by a pivot pin 5 about a pivot axis, as indicated by arrow 5a for executing a rotational movement in the form of a pivoting movement. Pivotably mounted on the pivot pin 5 is a drive 7 which can be rotated by means of the pivot pin 5 in the form of a pivoting movement. The drive 7 has a rotary shaft 8 which moves a tool 6, for example a milling head, in a rotational movement, as indicated by arrow 15. Although the Z1 axis 2 and the pivot pin 5 have their separate drives, these drives do not form part of the present invention and thus have been omitted from the drawing for the sake of simplicity. By means of the Z1 axis 2, the tool head 1 can perform a linear movement in the vertical direction upward or downward. By means of the pivot pin 5, the drive 7 can perform a rotational movement in the form of a pivoting movement. The rotating shaft 8 forms a further rotary axis which rotates in the direction of the associated illustrated arrow 15, and is also referred to as a spindle axis.

In order to achieve a high degree of dynamics in the movement control of the tool 6 in the direction of the Z1 axis 2 the vertical linear movement of the Z1 axis 2 is partially transferred in accordance with the present invention to an additional, highly dynamic linear Z2 axis 12. Without such a split, compared to the other axis, the Z1 axis 2 would have to move relatively great masses, thereby limiting the achievable movement dynamics of the machine. In other words, because of the high mass and the associated inertia of the Z1 axis 2 with regard to the movement control, only significantly smaller accelerations than at the other axis would then be possible that would lead to considerably longer machining times, and therefore higher costs.

According to the invention, the Z2 axis 12 is realized as a combination drive 10 and is integrated into the tool head 1. As a consequence of the small masses to be moved in the direction of the Z2 axis 12, the latter can be moved highly dynamically, i.e. with high acceleration. The range of movement of the additional Z2 axis 12 can be varied and optimized corresponding to the respective demands. The splitting up of the overall movement to the Z1 axis 2 and the Z2 axis 12 takes place substantially from a time-optimized aspect. Lesser dynamic movement components (components without high acceleration) of the movement of the tool, which often occur in the event of relatively large movements of the tool, are performed hereby by the Z1 axis 2 while highly dynamic movement components (components with high acceleration) of the tool 6 are executed by the Z2 axis 12. A linear movement of the tool 6 is split up by virtue of highly dynamic linear movement components of the tool 6 being performed by means of a shaft that is driven by the combination drive, and lesser dynamic linear movement components of the tool 6 being performed by a further shaft.

The splitting up of the movement of the tool 6 into a highly dynamic movement component and a lesser dynamic movement component, and also the actuation of the shafts, takes place in an open-loop and/or closed-loop control unit of the machine.

According to the invention, in order to realize a movement in the Z2 axis 12, a combination drive 10 is integrated into the tool head 1, for effecting a linear and rotational movement of the shaft. A specific construction of a combination drive is fully described in U.S. Patent Application Publication No: 2004/0261553 A1, published on Dec. 30, 2004, the entire specification and drawings of which are expressly incorporated herein by reference.

The combination drive 10 is constructed, by way of example, according to U.S. Patent Application Publication No: 2004/0261553 A1 and includes a housing which accommodates both a rotary drive in the form of an electric motor to rotate a shaft 11 in the direction of the arrow 13, and a linear drive, also in the form of an electric motor, to move the shaft 11 in a linear direction. Thus, the combination drive 10 not only causes the shaft 11 to rotate, but the shaft 11 can also execute a linear movement along the Z2 axis 12. The combination drive 10 can therefore drive the shaft 11 both rotationally and linearly.

The combination drive 10 can be moved up and down in the vertical direction in a direction of the Z1 axis 2. The combination drive 10 drives the shaft 11, wherein the shaft 11, as already described above, is driven both rotationally and also linearly by the combination drive 10. The shaft 11 therefore forms a combination which is movable about the rotary axis 13 and in the direction of the linear Z2 axis 12. The shaft 11 can therefore perform a linear and rotational movement, wherein the linear and rotational movements can be performed at the same time. FIG. 2 illustrates the two possible movements of the shaft 11. The shaft 11 is connected to the pivot pin 5, so that the pivot pin 5 can be rotated by means of a rotational movement of the shaft 11. By means of the pivot pin 5, it is possible for a drive 7 to be precisely rotated in the direction of the pivot 5. The drive 7 causes the shaft 8 to rotate, which shaft 8 in turn drives the tool 6. The movement of the pivot pin 5 and the rotation of the shaft 8 are indicated by corresponding associated arrows. By means of the combination drive 10, the highly dynamic linear Z2 axis 12, indicated by a corresponding arrow, and the rotary axis 13, which is likewise indicated by a corresponding arrow, is realized in the form of a combination shaft 11. Linear movements in the vertical direction which require a high acceleration are performed by means of the vertical linear movement of the shaft 11 which is driven by the combination drive 10, while slow movements in the vertical direction are performed by the Z1 axis. The drive system of the pivot pin 5 and of the Z1 axis 2 is not illustrated for the sake of simplicity.

Figure 3:
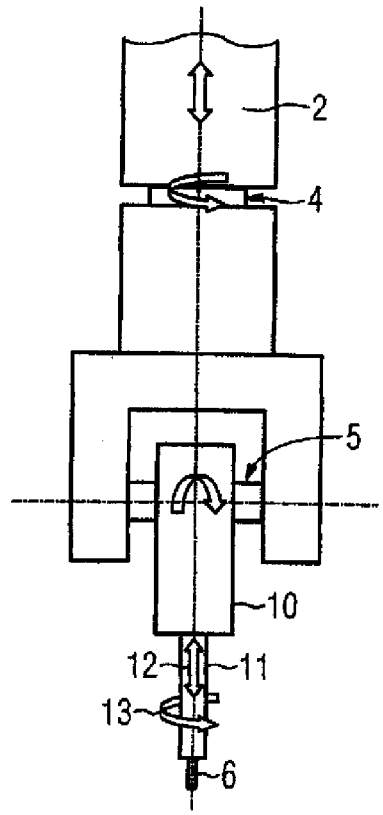
FIG. 3 is a detailed cutaway view of a second embodiment of a tool head according to the invention.

FIG 3 illustrates a further embodiment of the tool head 1 according to the invention. Parts corresponding with those in FIG. 2 are denoted by identical reference numerals and not explained again. The description below will center on the differences between the embodiments. In this embodiment, the combination drive 10 is installed into the tool head 1, instead of the rotary drive 7. The shaft 11 of the combination drive 10 again forms a Z2 axis 12 which is moveable in the linear direction, and is connected to the tool 6, wherein the tool 6 is caused to rotate by a corresponding rotational movement of the shaft 11. The tool 6 may represent a milling head, for example. The shaft 11 therefore constitutes a combination shaft in which the Z2 axis 12 and the so-called rotating spindle axis 13 are realized. The combination drive 10 can again be rotated by means of the pivot pin 5. The pivot pin 5 can be rotated about a pivot axis 4 by its own drive (not shown), and the tool head 1 can be moved in the vertical direction of the Z1 axis 2 of the tool head. In addition, the tool head 1 can be moved in the horizontal direction in the direction of the X axis and the Y axis (see FIG 1). In terms of function, the tool head according to FIG. 5 operates essentially in a same way as the tool head according to FIG. 2.

In the embodiment of the tool head of FIG. 3, the highly dynamic Z2 axis 12 is available not only for highly dynamic linear movements in the vertical direction, but is also available for other linear movement directions, in the event the pivot pin 5 is correspondingly rotated.

A so-called combination measure can be used hereby as a direct measuring system for measuring the linear and/or rotational movement of the shaft 11 of the combination drive 10, which combination measure is suitably integrated in the combination drive 10. An example of a suitable transducer arrangement and transducer evaluation is described in German Offenlegungsschrift 10 2004 056 211.3, to which reference is made herewith, the entire specification and drawings of which are expressly incorporated herein by reference.

It should also be noted that the rotation about the various rotation axes is, of course, possible in both rotational directions, and not only in the direction of the respectively illustrated arrow.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A tool head for moving a tool, comprising:
   a first shaft operatively connected to the tool;
   a combination drive movable in a vertical direction and having an output in the form of a second shaft, said combination drive including a first rotary drive to rotate the second shaft, and a linear drive to move the second shaft in the vertical direction;

a pivot pin operatively connected to the second shaft so as to be rotatable and linearly movable by the combination drive; and a second rotary drive operatively connected to the first shaft to rotate the first shaft, said second rotary drive being pivotably mounted to the pivot ping;

the tool head further comprising a drive to move the combination drive in the vertical direction and to thereby linearly move the tool at a first acceleration, said linear drive of the combination drive being constructed to linearly move the tool at a second acceleration which is greater than the first acceleration.

2. The tool head of claim 1, wherein the combination drive is constructed to execute the linear and rotational movements of the second shaft at a same time.

3. A milling machine, comprising:

a tool head having a first shaft operatively connected to a tool;

a combination drive movable in a vertical direction and having an output in the form of a second shaft, said combination drive including a first rotary drive to rotate the second shaft, and a linear drive to move the second shaft the vertical direction;

a pivot pin operatively connected to the second shaft so as to be rotatable and linearly movable by the combination drive; and a second rotary drive operatively connected to the first shaft to rotate the first shaft, said second rotary drive being pivotably mounted to the pivot pin;

the milling machine further comprising a drive to move the combination drive in the vertical direction and to thereby linearly move the tool at a first acceleration, said linear drive of the combination drive being constructed to linearly move the tool at a second acceleration which is greater than the first acceleration.

* * * * *

UNITED STATES PATENT AND TRADEMARK OFFICE
CERTIFICATE OF CORRECTION

| | |
|---|---|
| PATENT NO. | : 7,566,193 B2 |
| APPLICATION NO. | : 11/836394 |
| DATED | : July 28, 2009 |
| INVENTOR(S) | : Ali Haj-Fraj et al. |

It is certified that error appears in the above-identified patent and that said Letters Patent is hereby corrected as shown below:

Column 5, claim 1, line 8: replace "ping" with --pin--;

Column 6, claim 3, line 5: after "shaft" insert --in--.

Signed and Sealed this

Twenty-second Day of September, 2009

David J. Kappos
*Director of the United States Patent and Trademark Office*